(12) United States Patent
Hassell et al.

(10) Patent No.: US 6,356,622 B1
(45) Date of Patent: Mar. 12, 2002

(54) SYSTEM AND APPARATUS FOR ENHANCING A NETWORK LINK

(75) Inventors: Suzanne Hassell, Clearwater; Vincent Ciletti; Peter Calderon, both of Palm Harbor, all of FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/389,333

(22) Filed: Sep. 3, 1999

Related U.S. Application Data

(63) Continuation-in-part of application No. 08/850,174, filed on May 2, 1997, now Pat. No. 6,269,149.

(51) Int. Cl.[7] .............................................. H04M 1/24
(52) U.S. Cl. ..................... 379/1.01; 379/9.05; 379/25; 379/29.09; 379/32.04
(58) Field of Search ............................... 379/1, 27, 29, 379/34, 156, 12, 16, 9, 10, 15

(56) References Cited

U.S. PATENT DOCUMENTS

| | | | |
|---|---|---|---|
| 4,731,825 A | 3/1988 | Wojcinski et al. ........... 379/273 |
| 4,811,380 A | 3/1989 | Spear ........................... 379/60 |
| 5,185,779 A | 2/1993 | Dop et al. .................... 379/33 |
| 5,204,861 A * | 4/1993 | Wiebe ...................... 370/110.1 |
| 5,208,846 A * | 5/1993 | Hammond et al. ........... 379/15 |
| 5,280,541 A | 1/1994 | Marko et al. ................. 379/61 |
| 5,323,444 A | 6/1994 | Ertz et al. .................... 379/45 |
| 5,442,622 A * | 8/1995 | Hokari ......................... 370/16 |
| 5,532,939 A | 7/1996 | Psinakis et al. ......... 364/514 C |
| 5,544,224 A | 8/1996 | Jonsson et al. ............... 379/58 |
| 5,602,908 A | 2/1997 | Fan ............................. 379/199 |
| 5,619,561 A | 4/1997 | Reese .......................... 379/142 |
| 5,754,636 A | 5/1998 | Bayless et al. .............. 379/142 |
| 5,771,281 A | 6/1998 | Batten, Jr. ................ 379/93.23 |
| 6,049,592 A * | 4/2000 | Sanui .......................... 379/27 |
| 6,160,877 A * | 12/2000 | Tatchell et al. ............. 379/197 |
| 6,269,149 B1 * | 7/2001 | Hassell et al. ................. 379/1 |
| 6,272,209 B1 * | 8/2001 | Bridger et al. ................ 379/27 |

* cited by examiner

*Primary Examiner*—Binh Tieu
(74) *Attorney, Agent, or Firm*—Thomas, Kayden, Horstemeyer & Risley, LLP

(57) ABSTRACT

A system for providing robust and secure communications connections in a telecommunications network is disclosed. The system includes an apparatus supporting functions directed to the establishment of a backup link in the event of a network fault, security, and network connection prioritization. Each of these features are uniquely achieved by utilizing caller identification information associated with the calling party when users are interconnected via private branch exchanges to local area networks. The features of the invention are uniquely achieved by retrieving and utilizing data-link connection identifiers or Internet protocol addresses associated with the accessing user when users are connected to the network via frame relay routers. The apparatus establishes a backup link for rerouting data in a network by establishing a primary network link between a calling party and a called party, by examining call/link setup information at the called party to identify the calling party. The apparatus stores and accesses user identification information associated with each calling party. Thereafter, upon identifying a fault condition in the network link between the calling party and the called party, the apparatus retrieves the stored user identification information associated with the calling party from the called party. Using the retrieved user identification information, the apparatus establishes a backup network connection between the initial calling party and the called party.

38 Claims, 12 Drawing Sheets

SYSTEM AND APPARATUS FOR ENHANCING A NETWORK LINK

CROSS-REFERENCE TO RELATED APPLICATIONS

This application is a Continuation-in-Part of U.S. Pat. Ser. No. 6,269,149, filed May 2, 1997 and issued on Jul. 31, 2001.

BACKGROUND OF THE INVENTION

1. Field of the Invention

The present invention generally relates to telecommunication networks, and more particularly to a system and method for providing a robust network having enhanced security and integrity.

2. Discussion of the Related Art

Presently there is a need for enhanced security and integrity in a telecommunications network, while at the same time promoting and maintaining a flexible and robust telecommunications network.

In recent years, there has been a proliferation in digital telecommunication systems, and frequently, high capacity users define the endpoints of a telecommunications network. Service providers, local area networks (LANs), and private branch exchanges (PBXs), are all examples of such high capacity users. Typically, the incoming/outgoing network link connected to such high capacity users includes a high capacity trunk line, such as a T1, T3, E3, OC3, DS, or DSL line, which may interconnect with various other users, through, for example, a point-to-point connection or a frame relay network. As is known, such networks provide for high capacity throughput.

There are, however, various shortcomings in the present state of the art, including the handling of fault detection, security, and prioritization. Mechanisms are well known for identifying and notifying a user of a line interruption or other fault condition existing in the link between endpoints. However, endpoint equipment often responds by rerouting all data on a particular line, as opposed to on the affected network data path. For example, suppose one endpoint of a telecommunications network interfaces to a LAN (e.g. a corporate network) and the telecommunications link communicating with the endpoint is a high capacity T1 line. If the endpoint detects a fault or breakage in any channel(s) of the T1 line, present systems operate to reroute the entirety of the data traffic across that T1 line through another port, whether that be a secondary T1 line or an alternative backup link. However, fractional or partial line faults are often encountered, making such a global rerouting of data wasteful and unnecessary. For example, data transmitted across a frame relay network (e.g., packet-switched data) often suffers only a partial fault, or a network breakage at some intermediate point across which only a portion of the data to the ultimate endpoint traverses.

Another shortcoming noted in present state of the art systems relates to security. In keeping with the previous example of a telecommunications network endpoint being connected to a LAN, there is a tremendous need for providing secured entry from any remote caller outside the LAN to access the network by way of, for example, a dial-up connection. Frequently security issues, such as this one, are handled by password protection. In such systems, dial-up users are required to provide a password for access to the network. The inherent problem with this type of security implementation is that passwords can be compromised by unauthorized outsiders, who misuse the compromised password to disrupt or corrupt the system (i.e., the LAN).

Yet a further shortcoming of present systems relates to the prioritization of network access requests, particularly in bandwidth limited network systems. For example, in a plain old telephone system (POTS) or a basic rate interface integrated services digital network (ISDN-BRI). Access to the network is defined by a relatively narrow bandwidth, insofar as a large number of users might be concerned. In applications or systems such as these, it is important to provide a mechanism that allows incoming network access requests of higher priority to be accepted. Of course, this may require the termination of existing connections, but more importantly, requires the ability to detect the priority of an incoming access request in relation to an existing connection, which is presently a need that is largely not addressed by known systems.

There is, therefore, a need in the industry for a method and apparatus for addressing these and other related problems.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to an apparatus for establishing a backup communications link for rerouting data in a telecommunications network. In accordance with one aspect of the invention the apparatus establishes a primary network link between a calling party and a called party, and examines connection setup information at the called party location to identify the calling party. Thereafter, the apparatus stores identification information related to the calling party. Upon identification of a fault condition in the network link between the calling party and the called party, the apparatus retrieves the stored identification information of the calling party from the called party and uses the retrieved identification information to establish a backup network link. Alternatively, the apparatus can use the identification information of the calling party to identify a backup link path different from the original link path.

In accordance with the invention, the primary network link may be a T1 link, an ISDN link, or a POTS link. The link may be a point-to-point link, a permanent virtual circuit, a packet-switched frame relay circuit, or other similar network link. Preferably, the apparatus utilizes a lookup table or other database to store party profile information, which may include security information or priority data. Identification information related to the calling party is used to access/index such a table or database.

In accordance with another aspect of the present invention, the apparatus establishes a secured data link between a calling party and a called party. In accordance with this aspect of the invention, the apparatus receives a network access request from a remote user, obtains the calling party identification information, and uses the calling party identification information to access a lookup table. The apparatus determines whether a profile exists in the lookup table that corresponds to the calling party. If so, the apparatus further confirms from information provided in the lookup table, whether that user is entitled to access the system. If so, the apparatus directs the system to establish the connection with the remote user. In a preferred embodiment, the system may provide an added level of security by requiring the remote user to enter a password, as well.

Preferably, this aspect of the invention receives a signal from a calling party requesting a network link, and examines link setup information within the received signal for the called party to identify the calling party. The apparatus then accesses a memory storage area using the identification information associated with the calling party to retrieve information related to the calling party, and evaluates security data within the retrieved information. If the security data permits the establishment of a connection, then the apparatus directs the system to establish a network link with the calling party.

In accordance with yet another aspect of the present invention, the apparatus provides for prioritizing the establishment and maintenance of network links. In accordance with this inventive aspect, the apparatus establishes a first network link with a first calling party and receiving a signal from a second calling party that is requesting the establishment of a second network link. Upon receiving the signal, the apparatus examines the link setup information for the calling party to identify the second calling party. The apparatus accesses a memory storage area using the identification information related to the second calling party for use in evaluating user priority, and allocates resources in accordance with the evaluated information.

In a preferred embodiment, the apparatus allocates resources by assessing the priority of the calling party with respect to user(s) utilizing established network connections. More specifically, the apparatus may terminate the first network connection if the second calling party has a higher priority and system resources are unable to support the maintenance of both network links simultaneously.

In accordance with yet a further aspect of the present invention, the apparatus controllably establishes a network connection with remote equipment associated with a calling party. The apparatus includes receiving means for receiving a signal from a calling party seeking the establishment of a network link, and examining means for examining connection setup information included in the received signal, the network setup information including the caller identification information, the Internet protocol (IP) address, or data-link connection identifiers (DLCIs) associated with the calling party. The apparatus further includes a memory storage area for storing calling party information, and means for accessing and evaluating information stored in the memory storage area.

DESCRIPTION OF THE DRAWINGS

The accompanying drawings incorporated in and forming a part of the specification, illustrate several aspects of the present invention, and together with the description serve to explain the principles of the invention. In the drawings.

Figure 1:
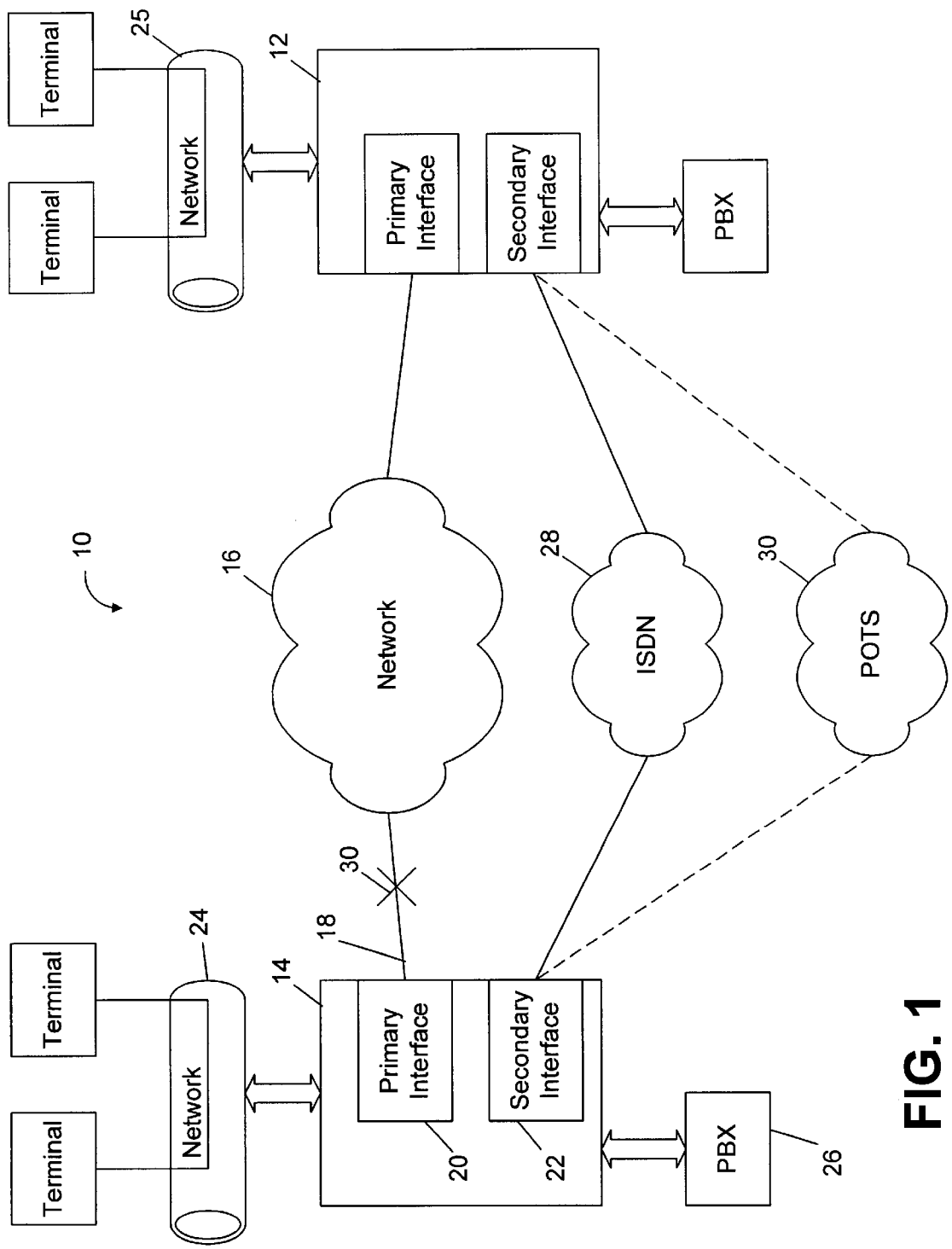
FIG. 1 is a top-level system diagram illustrating a telecommunications network link backup feature of the present invention.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Turning now to the drawings, FIG. 1 depicts a top-level system diagram, illustrating a telecommunications network connection backup feature for the present invention. More specifically, FIG. 1 generally illustrates a network system, designated by reference numeral 10, which connects a first or calling endpoint 12 and a second or called endpoint 14, in communication across a network 16. For purposes of the invention, the network 16 could be a POTS network, an ISDN network, a frame relay network, or virtually any other network. The link 18 connecting the endpoint 14 to the network 16 may, for example, be a T1 trunk, which is capable of handling high capacity data throughput.

For purposes of illustration, each endpoint 12 and 14 includes a primary interface 20 and a secondary interface 22. The primary interface is configured to interface with the primary network link 18, while the secondary interface 22 is designed to interface with a backup line, as will be described in more detail below. It will be appreciated that the primary interface 20 and secondary interface 22 need not necessarily be separate and distinct modules, but are depicted that way for purposes of illustration. It will also be appreciated by one skilled in the art that the primary network link 18 and any secondary network link established by the system, could be maintained via a radio frequency carrier. In one application of the present invention, the endpoint 14 may be a node in, for example, a corporate environment. In this regard, it may communicate with a network 24 and/or a private branch exchange (PBX) 26.

In accordance with one aspect of the present invention, the system 10 provides a means for establishing a backup link between endpoints 12 and 14 in the event that a fault (either total or partial) occurs in the network link between endpoints 12 and 14. In the illustrated embodiment, it is assumed that link 18 is a high capacity line, such as a T3 trunk. The backup link could, likewise, be provided over a T1 trunk, or alternatively over a slower speed line such as an ISDN-BRI 28 or a POTS 30. What is important for purposes of this aspect of the present invention, is that the called endpoint 14 is able to identify the calling endpoint, in order to establish a backup network link. As will be described below, this is accomplished by utilizing the user identification information transmitted to the called endpoint 14.

By way of example, suppose a calling party at endpoint 12 initiates a network connection request to endpoint 14. In a manner that is known and understood in the prior art, assume this network connection request gets routed across a link through network 16. Then assume a breakage or fault occurs along the link 18 at 30. Utilizing any of a number of means and methods that are well known in the prior art, the endpoint 14 may detect this fault, and upon fault detection initiate its fault handling or network connection backup routine. In this regard, the endpoint 14 utilizes the network connection user identification information that was transmitted to it upon establishment of the connection with network connection requested party 12. As is known, this network connection user identification information could be in the form of what is currently known as call waiting/caller identification. This user information, unless blocked, is inserted by the first central office (i.e., the central office adjacent endpoint 12) in the link between endpoint 12 and endpoint 14. The endpoint 14 may utilize this network connection user identification information to access, for example, a lookup table or database where it may retrieve pre-stored information about the user at endpoint 12. In this regard, it will be assumed that some prior knowledge (which is stored in the lookup table or database) is known about the user at endpoint 12.

For example, in one environment, the entities at endpoints 12 and 14 could be corporate affiliates that communicate regularly across network 16. In this way, corporate employees that are attached to network 25 at endpoint 12 may communicate with corporate employees that are attached to network 24 at endpoint 14. If, for example, network 16 is a frame relay network and the network connection backup instituted by endpoint 14 is to take place across the same frame relay network, then it may be necessary for endpoint 14 to re-map DLCIs, which identify all multiple logical connections to be multiplexed over the same channel. That is, in a frame relay environment, the network connection user identification information may be mapped via the lookup table to a preferred set of DLCIs which, in the event of a fault, may be re-mapped. Alternatively, the network connection user identification information may be mapped to logical IP addresses, in the event that endpoint 14 is a router. The essence, of this aspect of the invention is the use of the network connection user identification information to define (by way of a database or lookup table) a backup or alternative dial up connection.

In accordance with another aspect of the present invention, network user identification information is utilized for purposes of enhancing system security. As previously mentioned, prior art systems are known for implementing password protection in order to employ some means of system security. In this regard, a network user requesting access to an endpoint 14, for example, may be required to input a password in order to access the system. However, anyone that may learn this password could gain unauthorized access to the system. This type of password protection becomes increasingly suspect in multi-point, interconnecting networks 16, where password information transmitted across the network becomes increasingly susceptible to unauthorized detection. Therefore, as an added means of protection, a system constructed in accordance with one aspect of the present invention may employ network connection user identification information as a sole or secondary means of security. In this regard, a given endpoint 14, for example, would be preconfigured to accept network connection requests only from certain predefined users, and more specifically, from predefined endpoints for backup purposes. Since caller identification information is inserted at a local exchange, rather than at a user endpoint itself, this mechanism for security is less susceptible to deceit or failure. Of course, as an added means of protection, a system endpoint could require not only that a network connection request be placed from particular user locations, but also that the calling party enter an appropriate password, as a secondary level of security and protection.

Another aspect of the present invention relates to the use of network user identification information in connection with prioritization. While the varying needs and circumstances that give rise to the need for being able to prioritize network connection requests are too numerous to mention, suffice it to say that it is often desirable for an endpoint to be able to prioritize incoming network connection requests. This is particularly true when there is a limited bandwidth for transmission across the primary channel of communication. For example, consider a small business that does not have the resources and needs to justify expenditures for a high volume T1 line. Instead, it may purchase an ISDN line, or even more economically, one or two POTS lines. This company, however, may deem network connection requests received from a particular location to be of utmost importance, for whatever reason, and therefore want the ability to, if necessary, terminate an existing network connection in order to accept an incoming network connection request from that predetermined or pre-identified location. Certainly, if the incoming channel has sufficient bandwidth to accept an incoming network connection request without terminating any existing network connection requests, then it may be desirable to do so. For this reason, this aspect of the present invention has increased utility in limited bandwidth situations.

In a more complex environment, an endpoint may have a predetermined or predefined list of network user access locations, each of which receive independent priority. A first network connection user may have priority over a second network connection user, which may have priority over a third network connection user, and so on. Depending on the network connections already established, upon receipt of an incoming network connection request, this system will determine, based upon a list of predefined priority, whether to terminate an existing network connection, and if so, which one. A feature known as call waiting/caller identification is presently known in connection with POTS transmissions. This feature may be utilized by the present invention (assuming the link 18 is a POTS link or backup link) to identify the incoming network connection user and determine whether to establish a network connection, at the expense of an existing network connection.

By way of illustration, consider the situation where a calling party requests a network connection, and then, during that network connection, the calling party receives a separate call. If an evaluation of the caller identification information reveals to the calling party that the incoming call is from the called party, the calling party would understand that there must have been a fault in the connection between the parties and therefore the called party is initiating a backup. Therefore, this incoming call would be treated as a high priority call, and the presently outgoing call would be terminated in order to receive the incoming call.

The foregoing features highlight the various aspects of the present invention and will be discussed in more detail below. In regard to the network link backup aspect of the present invention, reference is now made to FIG. 2, which shows a software flowchart illustrating this aspect. Upon receiving an incoming call, (step 40) the system strips from the call request, the caller identification information and utilizes that information to establish the call (step 42). In this regard, the caller identification information may be used for purposes of security and/or prioritization, as will be discussed in more detail below. Assuming these threshold inquiries are met, then the system connects the call in step 44. The call then proceeds, in a manner that is well known. If no fault occurs and the network connection is terminated by normal means (either endpoint relinquishing the call), then the system will disconnect (step 46) and wait to receive the next incoming call request. If, however, during the duration of the call, a fault is detected (step 48) then the system will access the internal database or lookup table, based upon the caller identification information, to receive information that defines a backup link (step 50). This information will vary depending upon the medium or network across which the backup link is to be made. For example, if routers define the endpoints, then the backup information will include an IP address. Alternatively, if the backup is established across a frame relay network, then DLCIs will define the backup link. Once the system retrieves this information, then at step 52 it establishes a backup connection and exchanges whatever information necessary and appropriate with the original calling party to reroute only the relevant data over the backup network link.

Figure 3:
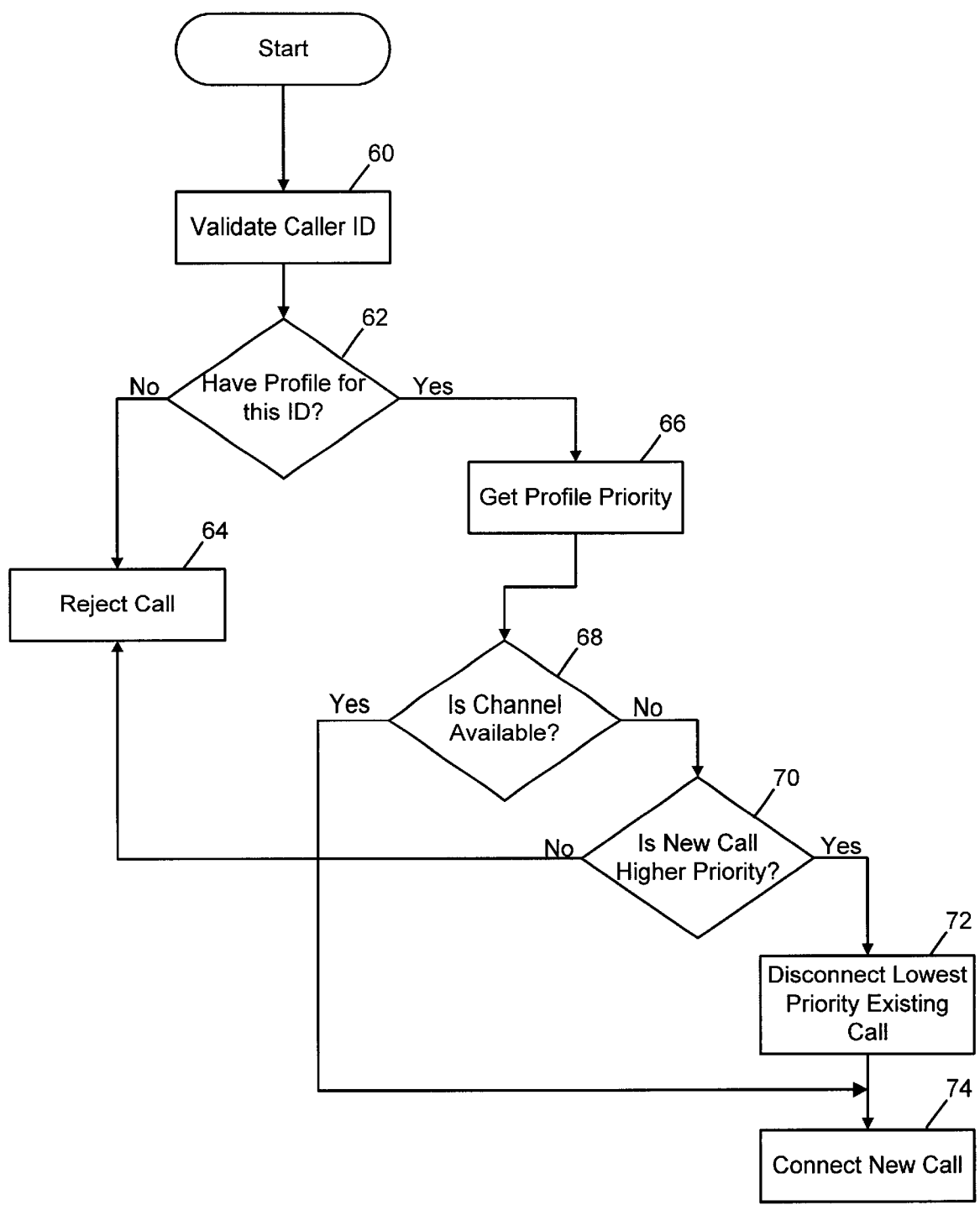
FIG. 3 is a software flowchart illustrating steps in an embodiment implementing the prioritization aspect of the present invention.

Turning now to FIG. 3, a flowchart is provided that depicts the top-level operation of the prioritization aspect of the present invention. Specifically, upon receiving an incoming call, the system validates the call by way of identifying the caller (at step 60). This validation step, having been briefly described above, will be described in more detail in connection with FIG. 4. Upon validating the caller, the system then determines from an internal database or from a look up table (at step 62) whether it has a prioritization profile for this particular caller. If not, it rejects the incoming call (step 64). Alternatively, although not illustrated, the system of a preferred embodiment may first check to see whether the incoming line/link has sufficient bandwidth to support the incoming network connection request. If so, it may accept the call after the step 60 validation. Of course, in such an embodiment any such accepted callers that do not have a profile are the first to be terminated once the bandwidth on the incoming link is exhausted.

In keeping with the description of FIG. 3, if the system detects a valid profile for the user associated with the incoming caller identification information, the system retrieves a profile for that call (step 66). It then checks to determine, based upon the bandwidth of the incoming link, whether a channel is available to accept the call (step 68). If not, this system (at step 70) determines whether the incoming call request has a higher priority than any of the existing network connections. If not, then the incoming call is rejected (step 64). If so, however, the system will disconnect or terminate the existing connection with the lowest priority (step 72) and establish a network connection with the incoming call (step 74). If the system had previously established connection with callers not having a priority profile, then those calls will be deemed as having the lowest priority, and therefore the first calls to be terminated at step 72.

Figure 4:
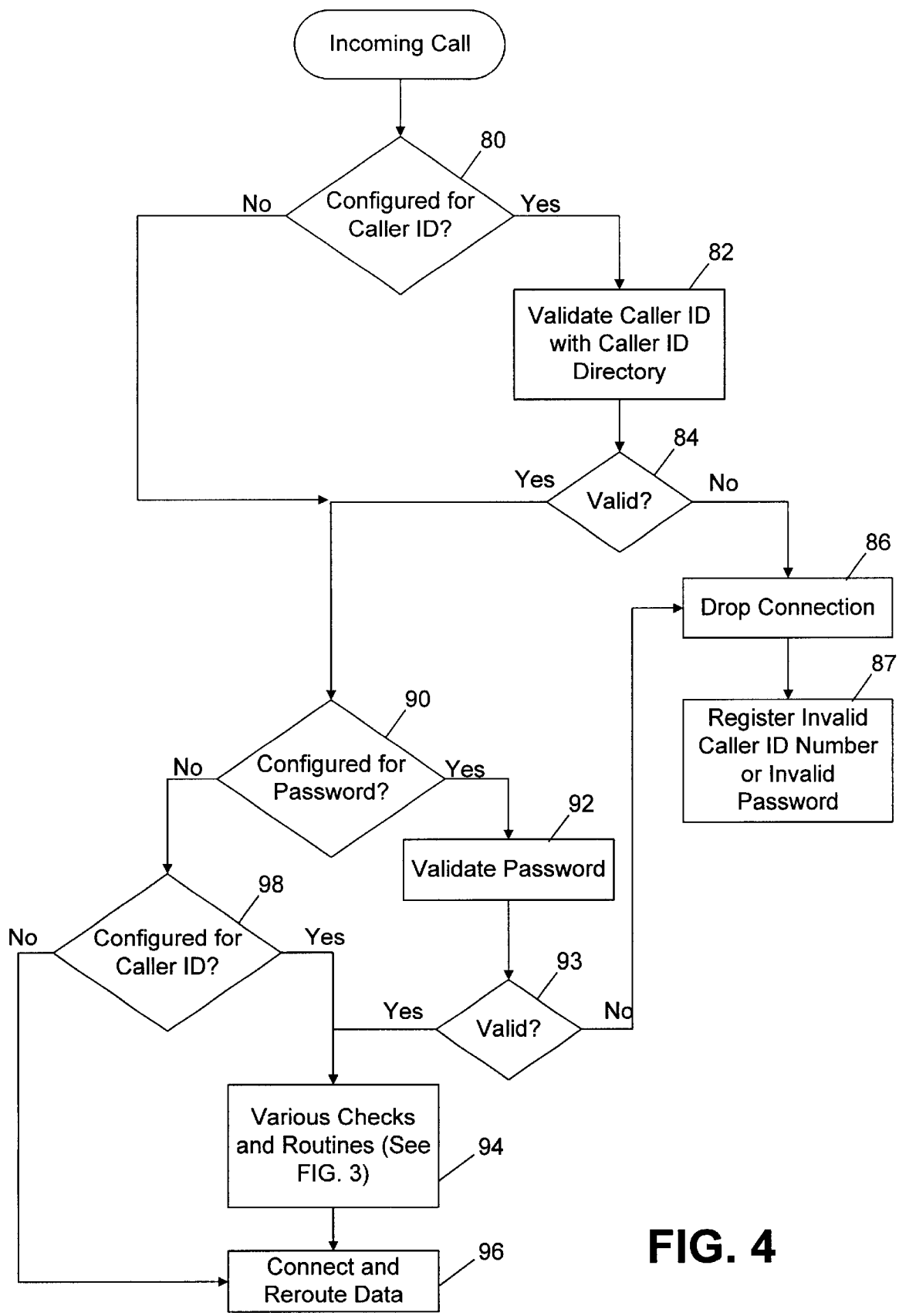
FIG. 4 is a software flowchart illustrating steps in an embodiment implementing the enhanced security aspect of the present invention.

Referring now to FIG. 4, a top level software flowchart illustrates the security aspect provided by the present invention, in conjunction with the caller identification information. Entry into any of the steps of this flowchart assumes that the Auto Answer feature of a modem or other communicating device is enabled. Otherwise, the system would not answer incoming calls.

Upon receiving an incoming call, the system looks to determine whether it is configured for caller identification (step 80). This step is provided only because caller identification is not necessarily supported in all geographic locations, by analog cellular phones, or some pay telephones. If the system is configured for caller identification, however, then the system (at step 82) validates the caller identification from a caller identification directory, or other internal lookup table or database. From such database, the system determines whether the caller identification of the incoming call is known and therefore valid (step 84). If not, the connection is dropped (step 86) and the system may be configured to log the entry attempt from an invalid or unregistered caller identification number (step 87). If, however, the caller identification is validated at step 84, then the system auto answers the call (step 88).

As illustrated, if the test of step 80 resolved to NO, or after execution of the auto answer element 88, the system proceeds to step 90 where it determines whether the system is configured for password access. If so, the system proceeds to step 92 where it validates the password with a password directory or lookup table. If valid (step 93), then the system proceeds to block 94 where it may perform other checks and routines, such as the prioritization routine discussed in connection with FIG. 3, before establishing the connection at step 96. If, however, step 92 determines that the entered or received password is invalid, then the system proceeds to step 86 where it drops the connection. If, at step 90, the system is not configured for password protection, then it proceeds to step 98 where it again checks to confirm whether the system is configured for caller identification. If not, the system may proceed to connect with the incoming call (step 96). Alternatively, if configured for caller identification, then the caller identification validation has already occurred at steps 82 and 84, so that system may proceed to step 94.

Figure 2:
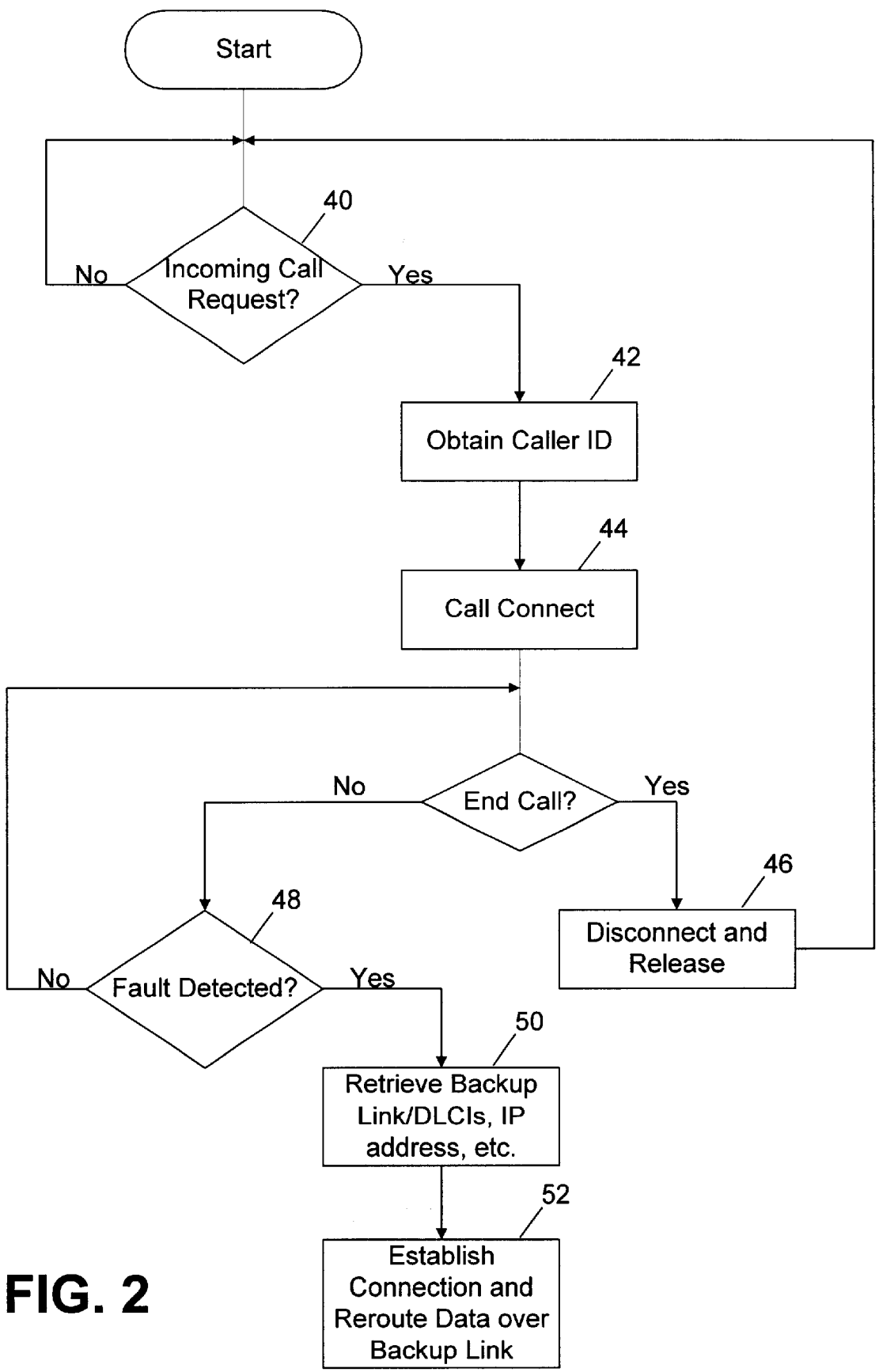
FIG. 2 is a software flowchart illustrating steps in an embodiment implementing the telecommunications network link backup aspect of the present invention.
Figure 5:
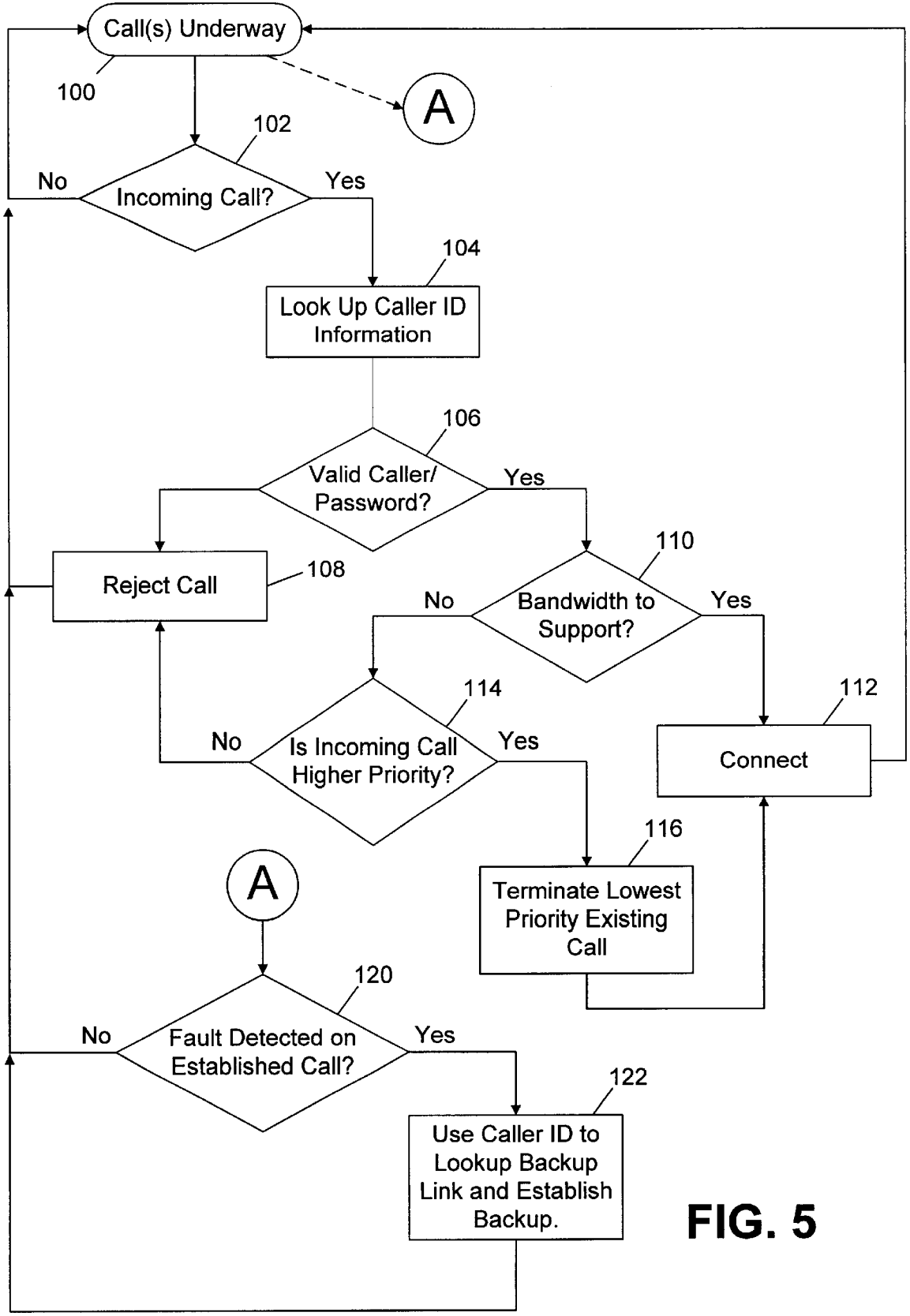
FIG. 5 is a top-level software flowchart illustrating steps of an embodiment implementing the combined functionality of the various aspects of the present invention.

Turning now to FIG. 5, the top level concepts described in FIGS. 2–4 are combined and illustrated in a unitary software flowchart. The first illustrated step is step 100, which assumes the system is operating in a steady state fashion with one or more network connections established. As illustrated, two different events can take the system out of this state. The first is the receipt of an incoming call, and the second is the identification or detection of a transmission fault. Upon receipt of an incoming call (step 102), the system obtains the caller identification information and, through its internal lookup table or database, looks to see if the caller is listed as a valid caller (step 104). The system may also employ password protection. The system then determines whether this caller has valid access to the system and/or checks for a received password to determine whether system access should be granted (step 106). If the caller and/or password is invalid, then the system (at step 108) rejects the call. Otherwise, if the caller is a valid network user, it proceeds to step 110 where it determines if the bandwidth on the incoming/outgoing telecommunication link will support the additional caller (e.g., whether a channel is available). If so, then the system proceeds to step 112 where it establishes a connection with the incoming call and returns to step 100. Otherwise, the system accesses the database to determine whether the incoming call has or is assigned a higher priority than in any of the presently existing network connections (step 114). If not, the system may return to step 108 and reject the incoming network connection request. If, however, the incoming call is assigned a higher priority than one or more of the existing network connections, then the system terminates the lowest priority existing network connection and proceeds to step 112 where it establishes a connection with the incoming call, where it can reroute data over the backup link, and thereafter returns to step 100.

As previously mentioned, the second event that leads the system to depart from step 100, is the detection of a fault on an established communication link. If a fault is detected (step 120), then the system accesses the internal database according to the caller identification of the caller on the distant end of the communication link that is corrupt. Based upon the caller identification, the system retrieves from its database the relevant information for establishing a backup link to the caller (step 122). It then establishes that connection, by way of backup link, and returns to step 100.

Figure 6A:
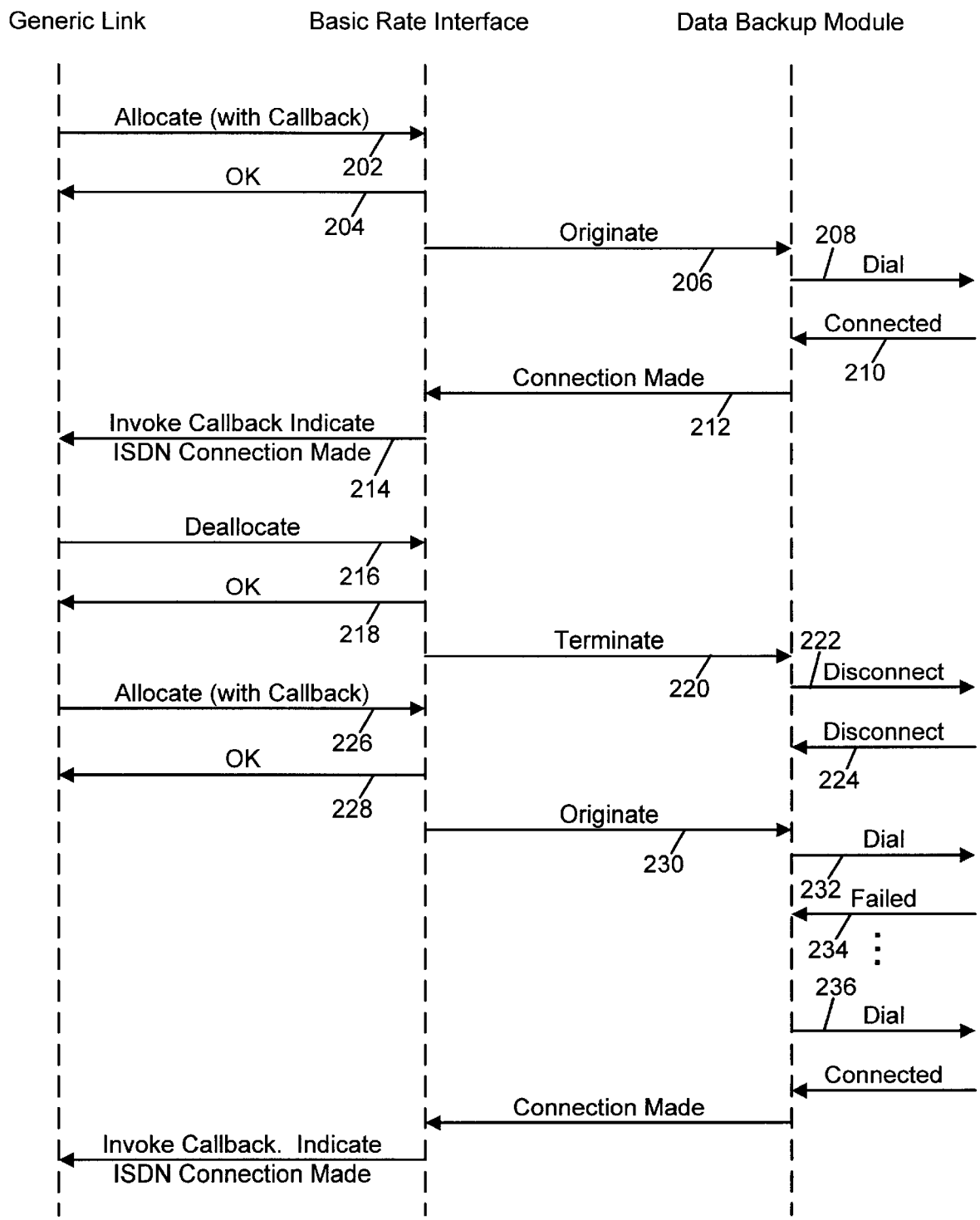
FIGS. 6A and 6B are timing diagrams illustrating the allocation and deallocation of network connection originating and network connection called peers.
Figure 6B:
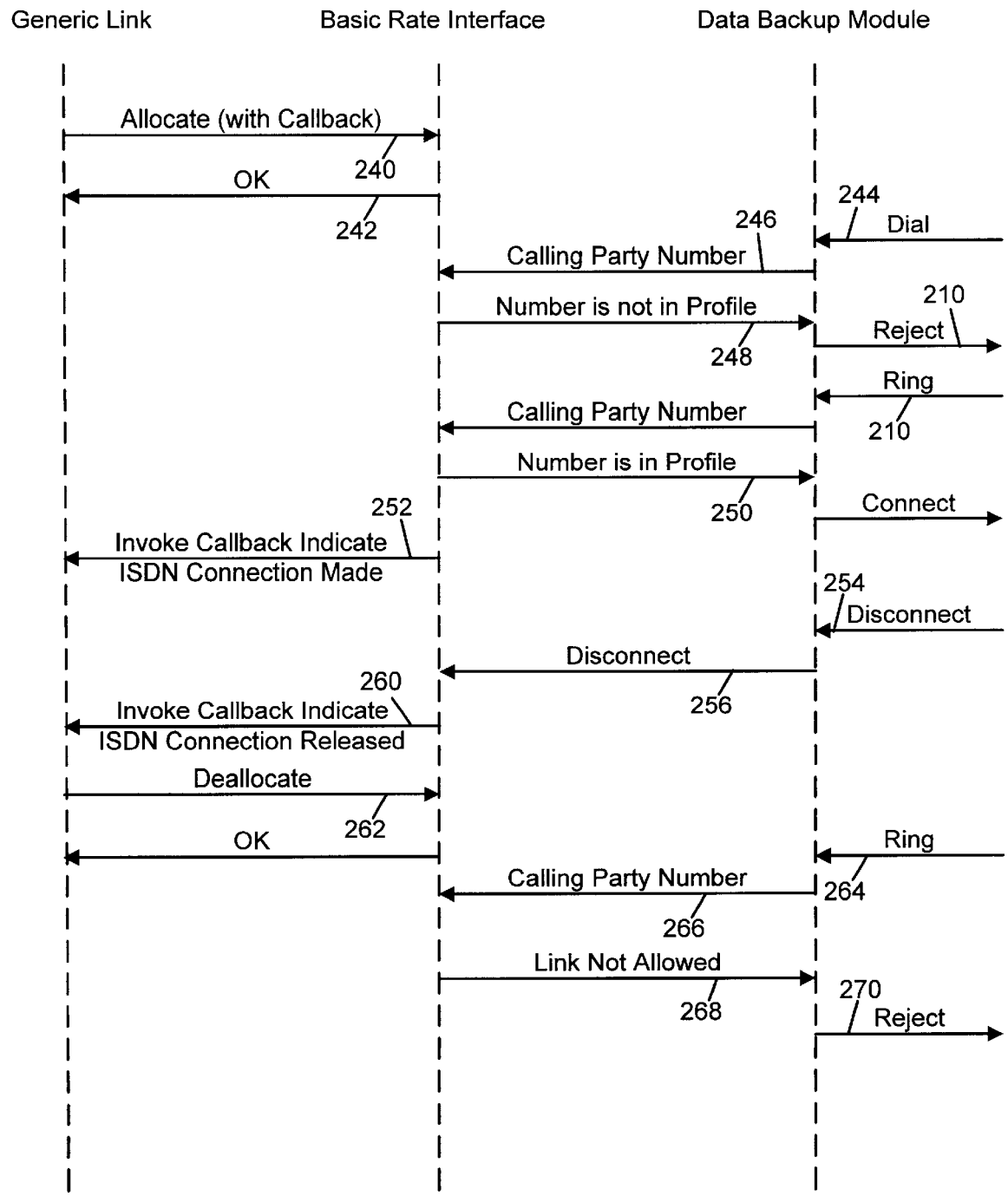

Reference is now made to FIGS. 6A and 6B which illustrate timing aspects of the present invention in connection with both the origination of a call and a receipt or answering of a call. Specifically, FIG. 6A illustrates the allocation/deallocation of an originate peer among a generic link, a basic rate interface (to an ISDN link) and the data backup module. Beginning with an allocate command 202 sent from the generic link to the basic rate interface, an acknowledge or OK signal 204 is returned, then the basic rate interface transmits an originate request 206 to the data backup module which dials 208 over the link and establishes a connection 210. Upon receiving indication that the connection is established, the data backup module then transmits to the basic rate interface a connection made signal 212, which basic rate interface then transmits an invoke callback message 214 to the generic link and indicates that an ISDN connection has been made. Upon deallocation, the generic link transmits to the basic rate interface a deallocate signal 216, which is acknowledged 218. The basic rate interface then transmits a terminate signal 220 to the data backup module, which then transmits a disconnect signal 222 to disconnect the established link.

Once the generic link has received the acknowledgment 218 from the basic rate interface, acknowledging the generic link deallocate signal, then the generic link may again transmit an allocate signal 226 to the basic rate interface, which is acknowledged 228 as before. Similarly, after the link has been disconnected, then the basic rate interface can transmit an originate signal 230 to the data backup module, which, as described before, dials 232 to establish a connection over an ISDN line, for example. If, however, this dial backup fails 234, the data backup module may wait a predetermined period of time and then attempt to redial 236. This sequence is repeated until a connection is established or, alternatively, until a predetermined number of attempts have failed. The sequence then continues as described above.

Turning to FIG. 6B, a timing diagram is illustrated that depicts the allocate/deallocate sequence of an answer pier in accordance with the dial backup aspect of the present invention. Beginning with an allocate signal 240 transmitted from the generic link to the basic rate interface, which is acknowledged 242, the data backup module receives a ring signal 244 across, for example, an ISDN line. This ring signal 244 is generated (presumably) from a remote caller seeking to establish a backup link. The data backup module extracts the caller identification information to ascertain the calling party number and transmits 246 that number to the basic rate interface. The basic rate interface rate then, by accessing a lookup table, determines whether that number is stored within a database, lookup table, or other profile. If not, it transmits a signal 248 back to the data backup module accordingly, which rejects the incoming call. If, however, the number is in the profile, then an appropriate signal 250 is transmitted back to the data backup module which establishes a connection. The basic rate interface also transmits an invoke network connection callback signal 252 to the generic link, indicating that an ISDN connection is made.

At some time later, the data backup module receives a disconnect signal 254 from the remote caller, which data backup module then propagates a disconnect signal 256 to the basic rate interface, which then transmits an invoke callback signal 260 to the generic link indicating that the ISDN connection is now released. If the generic link transmits a deallocate link signal 262 to the basic rate interface, such signal 262 informs the basic rate interface that a channel is not available for connection. Thus, if the data backup module receives a ring signal 264 from a remote user, upon transmitting 266 the calling party number from the data backup module to the basic rate interface, the basic rate interface will respond 268 that a link is not allocated, and the data backup module will reject 270 the incoming call.

The foregoing timing diagrams have been provided for purposes of illustration, and will be appreciated by those skilled in the art upon an examination of the information disclosed herein.

Figure 7A:
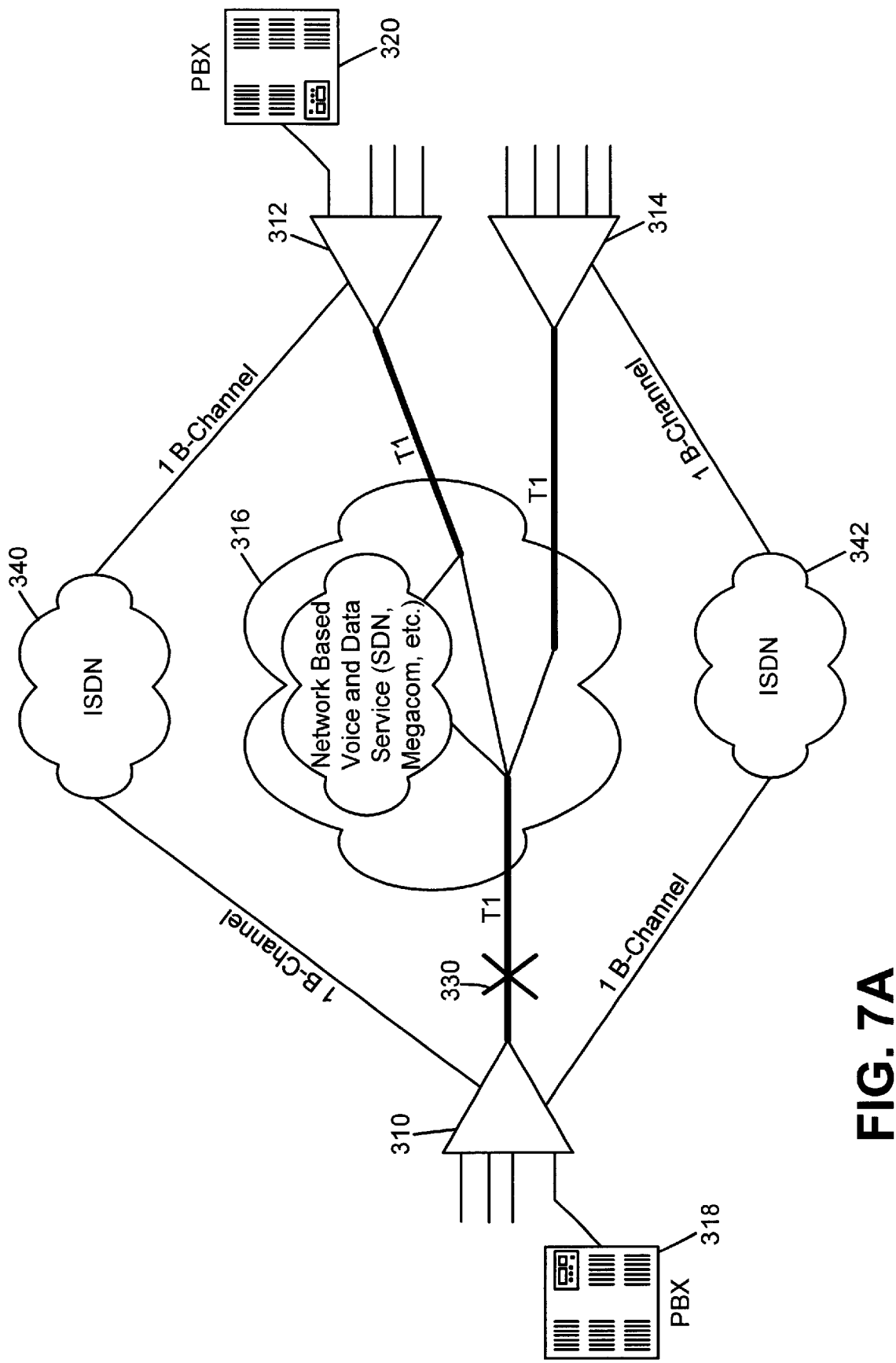
FIGS. 7A–7D depict various embodiments and operating environments illustrating the concepts and teachings of the present invention.

FIGS. 7A–7D reveal various embodiments and environments implementing the concepts and teachings of the present invention. Turning first to FIG. 7A, an embodiment is illustrated having three connection endpoints 310, 312, and 314. Each of these connection endpoints communicate across a network 316 by way of T1 trunk lines.

End points 310 and 312 are internally connected to PBXs 318 and 320 and may further be connected to other devices such as LANs.

FIG. 7A illustrates a total break or fault 330 in the T1 line of endpoint 310. As a result, the entirety of the data incoming or outgoing to/from endpoint 310 will be terminated. Thus, the backup link(s) must reroute the entirety of this data. In this regard, FIG. 7A illustrates a dual-channel reroute of data. One channel is rerouted over one B channel of a first ISDN network 340, and a second channel is rerouted over another B channel of the same or a second ISDN network 342. Alternatively, the two backup links could be routed through frame relay networks, POTS, or otherwise. The significance, with respect to the invention, is that the endpoint 310 recognized the need to rechannel information to/from endpoints 312 and 314 independently.

Figure 7B:
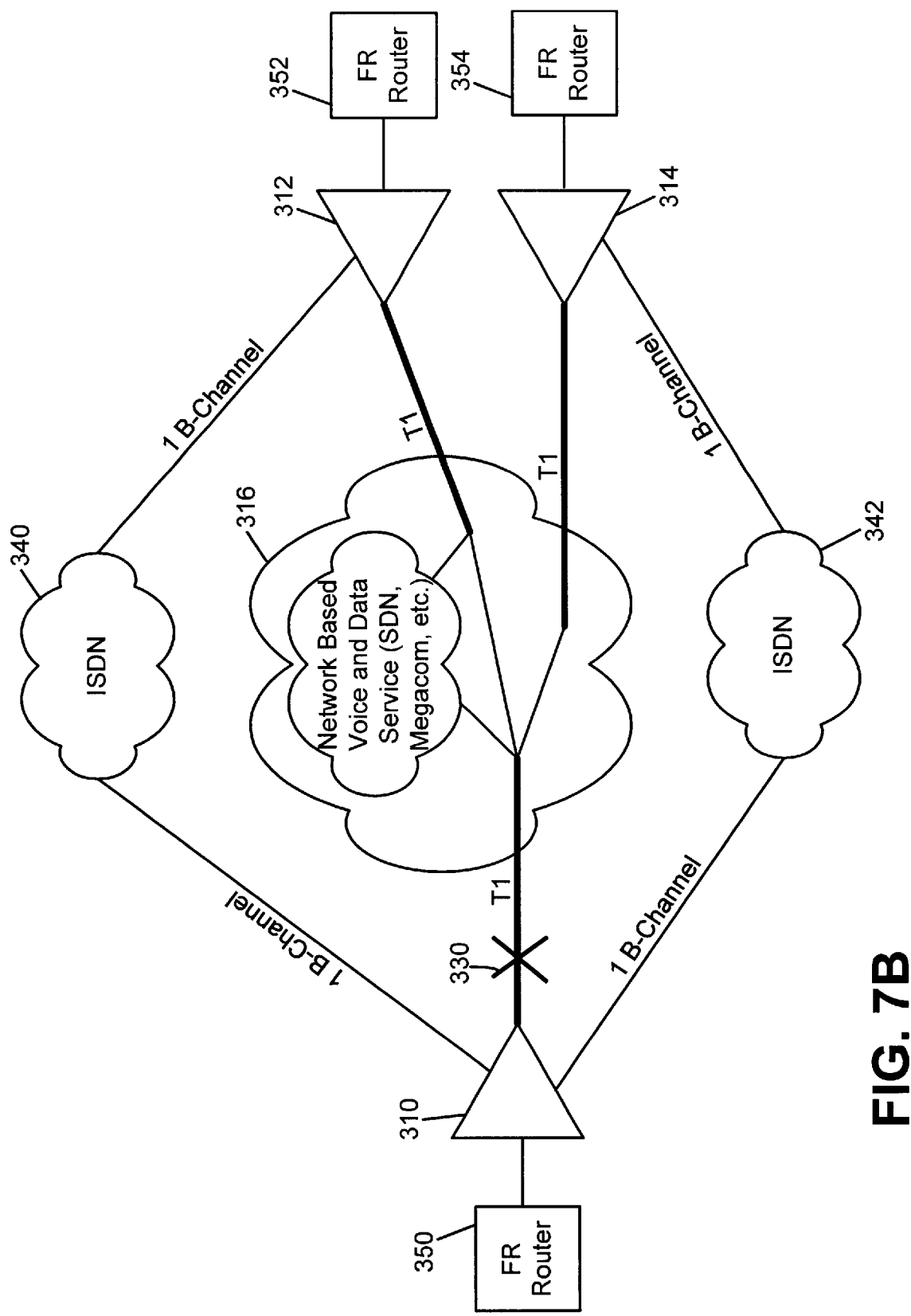

A similar illustration is provided in FIG. 7B, except that instead of endpoints 310, 312 and 314 being connected to PBXs or LANs, each are connected to frame relay routers 350,352 and 354. In this environment, in order for endpoint 310 to reroute data traffic and establish backup links to endpoints 312 and 314, it must remap the DLCIs associated with endpoints 312 and 314.

Figure 7C:
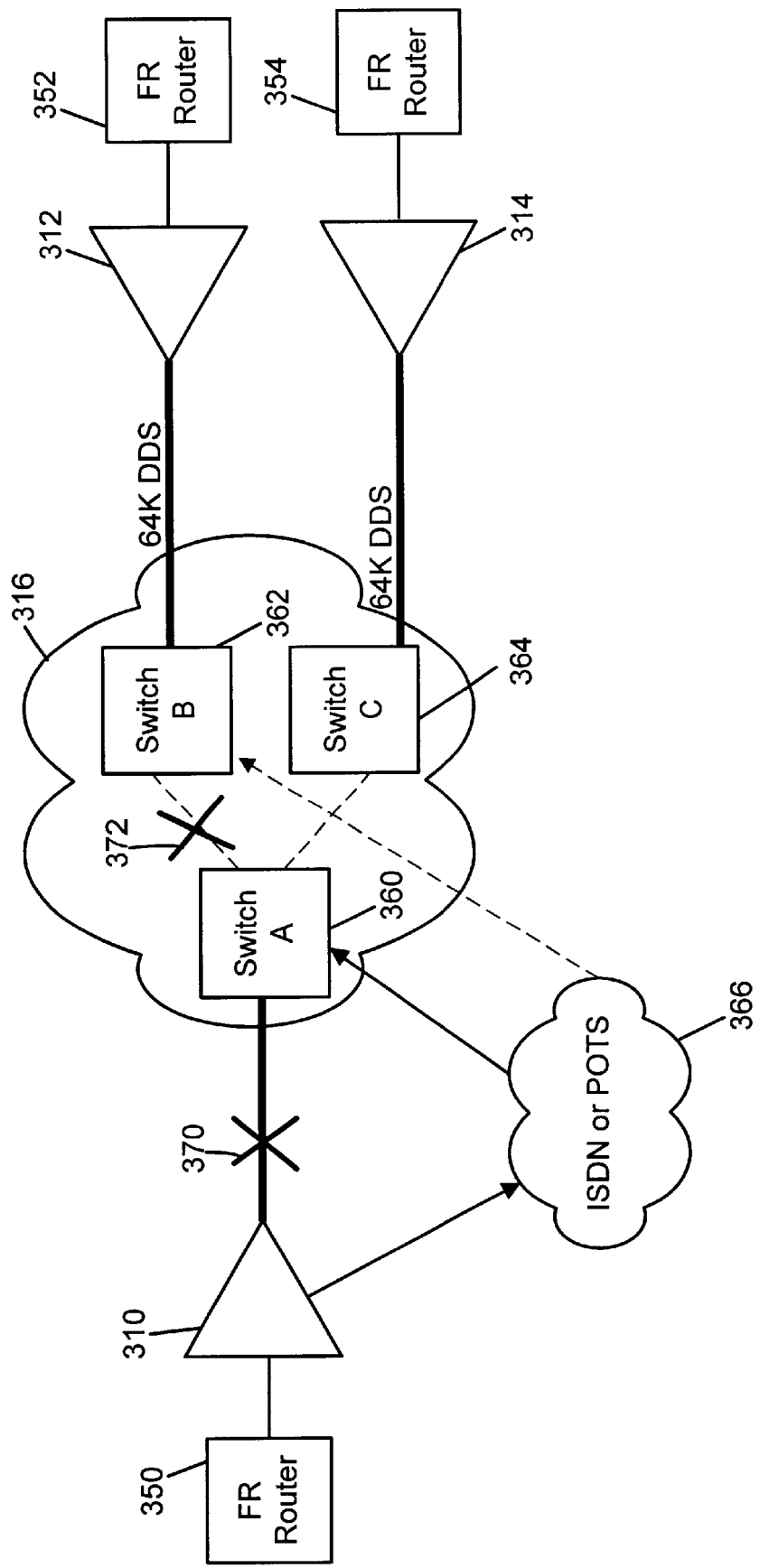

FIG. 7C illustrates a similar embodiment depicting the ability of one aspect of the present invention to establish backup links to accommodate a partial rerouting of data. More specifically, FIG. 7C illustrates a frame relay network 316 with switches 360, 362, and 364, through which different virtual circuits are going to different destinations. Some of the virtual circuits may be experiencing fault or link difficulties while others may not, depending upon where the fault or breakage occurs. For example, a breakage at 370 may be accommodated by rerouting data from endpoint 310 to switch 360. This rerouting may be done in a manner previously described through an alternative frame relay network, an ISDN, a POTS 366, or otherwise. Alternatively, if the breakage occurs at 372, between switch 360 and 362, data may be rerouted from switch 360 to 362 by way of switch 364. Generally, when establishing a backup link in this environment, the data path identifiers, or DLCIs, may need to be remapped to enable the backup to occur properly.

Occasionally, however, the packet switches inside the network may provide a redundant backup destination or switch interface used to avoid problems in the network. If such a redundant interface is set up to provide the same virtual path interface as the primary switch, no additional remapping needs to be done. The backup switch is then responsible for rerouting the data correctly onto the network.

Figure 7D:
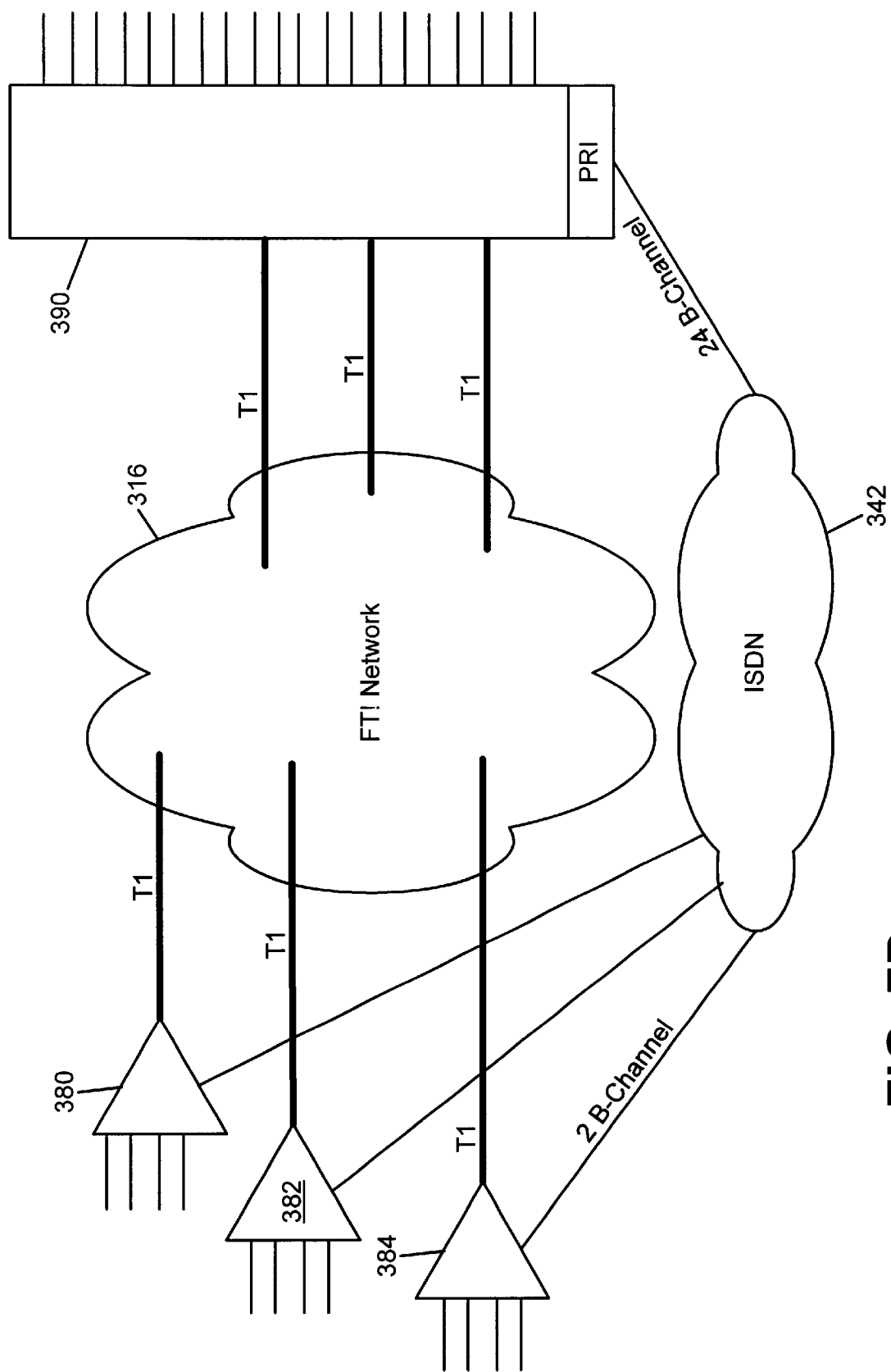

FIG. 7D illustrates potential backup links between endpoints 380, 382, and 384 with a central site 390. Each of the endpoints 380, 382, and 384 may employ a basic rate interface, utilizing the two B channels of an ISDN for purposes of the backup configuration, while the central site 390 may employ a primary rate interface having twenty-four B channels for establishing backup links through an ISDN 342. The manner and protocol of identifying faults in establishing these links may be accomplished in accordance with the teaching described above, and need not be repeated.

Figure 8:
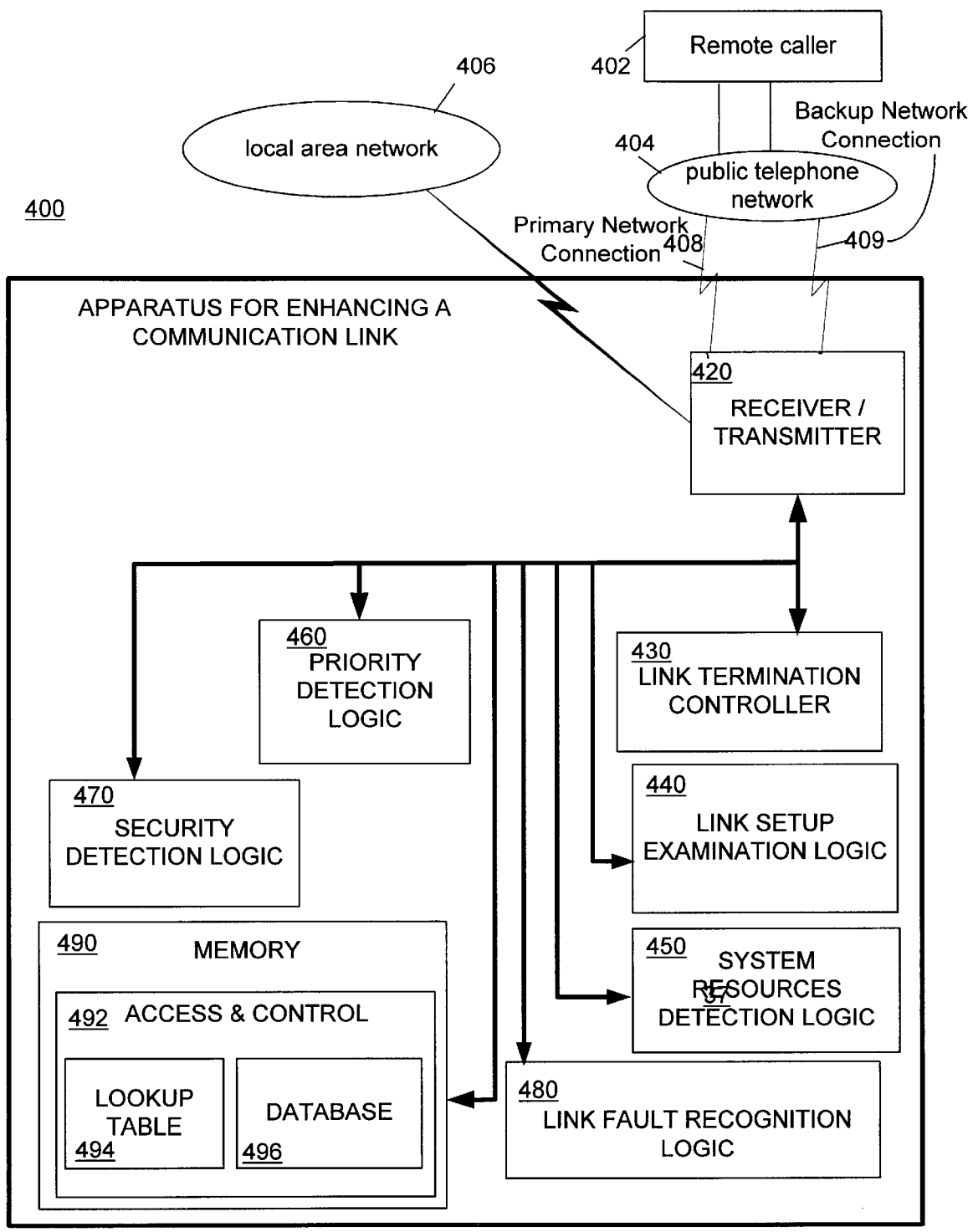
FIG. 8 depicts a top-level view of the apparatus illustrating the functionality of the various aspects of the invention, specifically, link setup examination and control, network resource management, fault detection, priority detection and control, and security detection and control.

FIG. 8 illustrates an alternative embodiment of the present invention. More specifically, FIG. 8 illustrates an apparatus 400 for enhancing a communications link, which connects a remote caller 402 on a public telephone network 404 via primary network connection 408, to a local area network 406. For purposes of the invention, the primary network connection 408, could be a POTS, an ISDN, a frame relay, a router, or any other telecommunications network connection. The primary network connection 408, connecting the remote caller 402 to the local area network 406 may, for example, be a T1 trunk, which is capable of handling high data capacity throughput.

In accordance with the present invention, the apparatus 400 for enhancing a communication link provides a means for establishing a backup communication link 409 between the local area network 406 and a remote caller 402, in the event that a fault (either total or partial) occurs in the telecommunications link between the remote caller 402 and receiver/transmitter 420. As will be described in detail below, this is accomplished by utilizing the caller identification, or caller ID, feature; Internet protocol address information; or data-link connection identifiers transmitted to the receiver/transmitter 420 upon call/link initialization.

By way of example, a remote caller 402 initiates a network access request via a public telephone network 404 in a manner that is known and understood in the art. After successful initialization of the primary communication link 408, the apparatus 400 utilizes the caller identification information that was transmitted to it at the establishment of the connection by removing and examining the caller ID information in link setup examination logic 440 and storing the caller ID in memory 490. At some point after communication link establishment, a breakage or fault may occur along the primary communication link 408. Utilizing any number of means and methods that are well known in the prior art, the apparatus 400, detects the fault in link fault recognition logic 480, and upon fault detection initiates a fault handling routine to establish a backup network connection 409. In this regard, the apparatus 400, accesses known information associated with the remote caller 402 via lookup table 494 or a database 496 containing known information about authorized remote users of the local area network 406. The retrieved user identification information is used by receiver/transmitter 420 to establish a backup network connection 409 with the remote caller 402.

In accordance with another aspect of the present invention, caller identification information is utilized to enhance network system security. In this regard, a remote caller 402 calling in to receiver/transmitter 420 to initiate a primary network link 408 with a local area network 406 will be identified at call initialization by link setup examination logic 440. Security detection logic 470 will utilize the caller identification information determined by link setup examination logic 440 in conjunction with information stored on predefined remote users in memory 490 to determine whether it is appropriate to establish a primary network link 408.

Another aspect of the present invention relates to the use of caller identification information in conjunction with managing network system resources. In this regard, a remote caller 402 calling in to receiver/transmitter 420 to initiate a primary network link 408 with a local area network 406 will be identified at call initialization by link setup examination logic 440. System resources detection logic 450 will utilize the caller identification information determined by link setup examination logic 440 in conjunction with information stored on predefined remote users in memory 490 and priority detection logic 460 to determine whether it is appropriate to establish a primary network link 408 with this particular remote caller 402 given the current resource load on network interface resources. If it is determined that a calling party has a higher priority than that of an established user and that current network resource capacity will not support both users simultaneously, link termination controller 430, working through receiver/transmitter 420, will nominally terminate the network link with the lower priority user before establishing a primary network connection 408 with the calling party.

It will be appreciated by those skilled in the art that the remote caller identification information need not be in the form of caller ID if, for example, public telephone network 404 is replaced by a frame relay network and the backup network connection 409 instituted by receiver/transmitter 420 is to take place across the same frame relay network. In that case, it may be necessary for apparatus 400 to re-map DLCIs, which identify all multiple logical connections to be multiplexed over the same channel. That is, in a frame relay environment, the network connection user identification information may be mapped via lookup table 494 to a preferred set of DLCIs which, in the event of a fault, may be re-mapped. Alternatively, the network connection user identification information may be mapped to logical IP addresses, in the event that remote caller 402 has established primary network connection 408 and backup network connection 409 with local area network 406 via a router as opposed to a public telephone network 404. The essence, of this aspect of the invention is the use of the network connection user identification information to define (by way of a database 496 or lookup table 494) a backup network connection 409.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. An apparatus for responding to failures of a communication network having a plurality of link portions comprising:

means for receiving each one of a plurality of signals from an associated calling party requesting establishment of a primary network link;

means for examining call setup information included in each one of the received signals, the call setup information including a calling party profile;

means for detecting a partial failure of at least one of the plurality of link portions; and means for establishing a backup connection corresponding to at least one failed link portion such that signals communicated over the failed link portion are communicated over the backup connection.

2. The system of claim 1, further comprising a memory configured to store the calling party profile.

3. The system of claim 1, wherein the means for establishing the backup connection corresponding to the failed link portion uses a portion of the calling party profile that includes at least calling party identification information to define the backup connection.

4. The system of claim 1, wherein the means for establishing the backup connection corresponding to the failed link portion uses a portion of the calling party profile that includes at least one data-link connection identifier (DLCI) to define the backup connection.

5. The system of claim 1, wherein the means for detecting the partial failure further comprises a means for detecting a physical layer failure of the at least one failed link portion.

6. The system of claim 1, wherein the means for detecting the partial failure further comprises a means for detecting a link layer failure of the at least one failed link portion.

7. The system of claim 6, wherein the means for establishing the backup connection further includes a means for determining a backup virtual path, the backup virtual path corresponding to the at least one of the plurality of link portions and an at least one non-failed portion of the communication network.

8. The system of claim 7, further comprising a means for remapping a portion of the calling party profile that includes at least one data-link connection identifier (DLCI), the at least one DLCI corresponding to the failed link portion.

9. The system of claim 7, further comprising a means for remapping a portion of the calling party profile that includes at least one internet protocol address, the at least one internet protocol address corresponding to the failed link portion.

10. The system of claim 7, further comprising a means for remapping a portion of the calling party profile that includes at least calling party identification information, the calling party identification information corresponding to the backup virtual path.

11. A method for responding to failures of a communication network having a plurality of link portions, the method comprising the steps of:

receiving each one of a plurality of signals from an associated calling party requesting an establishment of a primary network link;

examining call setup information included in each one of the received signals, the call setup information including calling party profile;

detecting a partial failure of at least one of the plurality of link portions; and establishing a backup connection corresponding to at least one failed link portion such that signals communicated over the failed link portion are communicated over the backup connection.

12. The method of claim 11, further comprising the step of storing in a memory the calling party profile.

13. The method of claim 11, wherein the step of establishing the backup connection corresponding to the failed link portion uses a portion of the calling party profile having at least calling party identification information to define the backup connection.

14. The method of claim 11, wherein the step of establishing the backup connection corresponding to the failed link portion uses a portion of the calling party profile having at least one data-link connection identifier (DLCI) to define the backup connection.

15. The method of claim 11, wherein the step of detecting the partial failure further comprises the step of detecting a physical layer failure of the at least one failed link portion.

16. The method of claim 11, wherein the step of detecting the partial failure further comprises the step of detecting a link layer failure of the at least one failed link portion.

17. The method of claim 16, wherein the step of establishing the backup connection further includes the step of determining a backup virtual path, the backup virtual path corresponding to at least one of the plurality of link portions and at least one non-failed portion of the communication network.

18. The method of claim 17, further comprising the step of remapping a portion of the calling party profile that includes at least one data-link connection identifier (DLCI), the at least one DLCI corresponding to the failed link portion.

19. The method of claim 17, further comprising the step of remapping a portion of the calling party profile that includes at least one Internet protocol address, the at least one internet protocol address corresponding to the failed link portion.

20. The system of claim 17, further comprising the step of remapping a portion of the calling party profile having at least calling party identification information, the calling party identification information corresponding to the backup virtual path.

21. An apparatus for responding to failure of a communication network comprising:

means for receiving each one of a plurality of signals from an associated calling party requesting establishment of a primary network link;

means for examining call setup information included in each one of the received signals, the call setup information including at least a calling party profile such that a link layer protocol of the primary network link is determined;

means for detecting a failure of the link layer protocol; and means for establishing a backup connection corresponding to a backup link layer protocol such that the plurality of signals are communicated over the backup connection.

22. The system of claim 21, wherein the means for detecting the failure of the link layer protocol further comprises a means for detecting a partial failure of the link layer protocol, and the means for establishing the backup connection further comprises a means for establishing a backup connection portion corresponding to a portion of the backup link layer protocol such that the plurality of signals are communicated over the backup connection portion.

23. The system of claim 21, further comprising a memory configured to store the calling party profile.

24. The system of claim 21, wherein the means for establishing the backup connection corresponding to the failed link level protocol uses a portion of the calling party profile that includes at least calling party identification information to define the backup connection.

25. The system of claim 21, wherein the means for establishing the backup connection corresponding to the failed link level protocol uses a portion of the calling party profile that includes at least one data-link connection identifier (DLCI) to define the backup connection.

26. The system of claim 21, wherein the means for establishing the backup connection further includes a means for determining a backup virtual path, the backup virtual path corresponding to the backup connection.

27. The system of claim 26, further comprising a means for remapping a portion of the calling party profile that includes at least one data-link connection identifier (DLCI), the at least one DLCI corresponding to the backup virtual path.

28. The system of claim 26, further comprising a means for remapping a portion of the calling party profile that includes at least one internet protocol address, the internet protocol address corresponding to the backup virtual path.

29. The system of claim 26, further comprising a means for remapping a portion of the calling party profile that includes at least calling party identification information, the calling party identification information corresponding to the backup virtual path.

30. A method for responding to failure of a communication network, the method comprising the steps of:
   receiving each one of a plurality of signals from an associated calling party requesting establishment of a primary network link;
   examining call setup information included in each one of the received signals, the call setup information including a calling party profile such that a link layer protocol of the primary network link is determined;
   detecting a failure of the link layer protocol; and
   establishing a backup connection corresponding to a backup link layer protocol such that the plurality of signals are communicated over the backup connection.

31. The method of claim 30, wherein the step of detecting the failure of the link layer protocol further comprises the step of detecting a partial failure of the link layer protocol, and the step of establishing the backup connection further comprises the step of establishing a backup connection portion corresponding to a portion of the backup link layer protocol such that the plurality of signals are communicated over the backup connection portion.

32. The method of claim 30, further comprising step of storing in a memory the calling party profile.

33. The method of claim 30, wherein the step of establishing the backup connection corresponding to a failed link level protocol uses a portion of the calling party profile that includes at least calling party identification information, the calling party identification information corresponding to the backup connection.

34. The method of claim 30, wherein the step of establishing the backup connection corresponding to a failed link level protocol uses a portion of the calling party profile that includes at least one data-link connection identifier (DLCI), the DCLI corresponding to the backup connection.

35. The method of claim 30, wherein the step of establishing the backup connection further includes the step of determining a backup virtual path, the backup virtual path corresponding to the backup connection.

36. The method of claim 35, further comprising the step of remapping a portion of the calling party profile that includes at least one data-link connection identifier (DLCI), the at least one DLCI corresponding to the backup virtual path.

37. The method of claim 35, further comprising the step of remapping a portion of the calling party profile that includes at least one internet protocol address, the internet protocol address corresponding to the backup virtual path.

38. The method of claim 35, further comprising the step of remapping a portion of the calling party profile having at least calling party identification information, the calling party identification information corresponding to the backup virtual path.

* * * * *